United States Patent
Barde et al.

(10) Patent No.: US 8,132,167 B2
(45) Date of Patent: Mar. 6, 2012

(54) CONTEXT BASED VIRTUALIZATION

(75) Inventors: Kaushik Barde, Sunnyvale, CA (US); Richard Bramley, Mansfield, MA (US); Matthew Ryan Laue, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 742 days.

(21) Appl. No.: 12/317,639

(22) Filed: Dec. 23, 2008

(65) Prior Publication Data

US 2010/0162243 A1  Jun. 24, 2010

(51) Int. Cl.
G06F 9/455 (2006.01)
(52) U.S. Cl. .......................................................... 718/1
(58) Field of Classification Search .................. None
See application file for complete search history.

(56) References Cited

U.S. PATENT DOCUMENTS

| | | | | |
|---|---|---|---|---|
| 2006/0075146 A1* | 4/2006 | Schoinas et al. | ......... | 710/3 |
| 2008/0244206 A1* | 10/2008 | Heo et al. | ......... | 711/163 |
| 2008/0288940 A1* | 11/2008 | Adams et al. | ......... | 718/1 |
| 2008/0288941 A1* | 11/2008 | Adams et al. | ......... | 718/1 |

OTHER PUBLICATIONS

Interrupt Architecture Enhancements in Microsoft Windows Vista (2004 Microsoft Corporation) 2004, entire document, especially pp. 27 to 29.

* cited by examiner

Primary Examiner — Corey S Faherty

(57) ABSTRACT

Methods, systems, apparatuses and program products are disclosed for managing device virtualization in hypervisor and hypervisor-related environment which include both pass-thru I/O and emulated I/O.

This may include setting up a page table entry so an instruction may execute untrapped in an unprivileged domain such as by creating a new entry in a page table with requisite read or write permissions set. Later the page table may be edited (or an entry deleted) so the same I/O instruction is trapped and responsively emulated.

In another embodiment of the invention, an electronic device may be provided with at least one controller; and one non-volatile memory having instructions encoded therein which, when executed, implement the context-based virtualization An advantage provided by the present invention is that performance of the device may be traded off against resource consumed dynamically responsive to system operating conditions. Also, I/O access to peripheral devices may be switched to and fro between emulation and pass-thru operation.

17 Claims, 4 Drawing Sheets

CONTEXT BASED VIRTUALIZATION

FIELD OF THE INVENTION

The present invention generally relates to personal computers and devices sharing similar architectures and, more particularly, to a system and corresponding method for managing input-output data transfers to and from programs that run in virtualized environments.

BACKGROUND OF THE INVENTION

The use of virtualization is increasingly common on personal computers. Virtualization is an important part of solutions relating to energy management, data security, hardening of applications against malware (software created for purpose of malfeasance), and the like.

One virtualization approach is to provide a small hypervisor which is tightly integrated to a few small and hardened application programs. A hypervisor may also host, but be only loosely connected to, an opaque O/S (Operating System) which is typically a complex and full-featured general purpose computer environment or O/S such as Microsoft® Windows® Vista® or a similar commercial product. An opaque O/S is an operating system for which the source code is unavailable to most users of it, typically because the O/S does not provide for Open Source. Thus it may also be referred to as a closed O/S.

By design, in some implementations, a hypervisor may support a single opaque O/S per operating session and virtualize its resources. The need to allow efficient non-virtualized access to some resources (typically by the opaque O/S) and yet virtualize and/or share other resources is desirable.

I/O device emulation is commonly used in hypervisor based systems such as the open source Xen® hypervisor. Use of emulation, including I/O emulation, can result in a substantial performance hit. On the other hand, it is desirable to emulate or virtualize the same devices or resources from time to time in response to changes in the prevailing operating conditions. For example, an Internet browser being used for an interactive user session may be a high-priority foreground task, whereas the same browser program might be considered a low-priority background activity while downloading a multi-megabyte sized file such as if it is time-shared with other interactivities.

Thus the need for pass-thru I/O as contrasted with emulated I/O may change within a single operating session and there is an advantage to reconciling the differing needs that thereby arise from time to time.

SUMMARY OF THE INVENTION

The present invention provides a method of executing a program for interrupt management and also apparatus(es) that embody or otherwise implement the method. In addition program products and other means for exploiting the invention are presented.

According to an aspect of the present invention, a method of executing a program includes: setting up a page table entry so an instruction may execute untrapped in an unprivileged domain. This may be accomplished by creating a new entry in a page table with requisite read or write permissions set.

Next executing the instruction for I/O pass-thru, for example by issuing a status read command to a disk controller. Then changing the page table so the same I/O instruction is trapped and then emulated. This may be accomplished by deleting the page table entry previously created or by other means.

In another embodiment of the invention, an electronic device may be provided with at least one controller; and one non-volatile memory having instructions encoded therein which, when executed, implement the method described above.

An advantage provided by the present invention is that performance of the device may be traded off against resource consumed dynamically responsive to system operating conditions.

A feature of the present invention is that I/O access to peripheral devices may be switched to and fro between emulation and pass-thru operation.

The disclosed invention includes, among other things, methods and techniques for providing more direct or so-called "pass-thru" I/O access for a subset of devices and/or resources, while allowing for the virtualization and/or emulation of the same devices and/or resources during a same operating session responsive to a change of operating conditions or context. Thus, embodiments of the present invention enable superior tradeoffs in regards to the problems and shortcomings outlined above.

BRIEF DESCRIPTION OF THE DRAWINGS

The aforementioned and related advantages and features of the present invention will become better understood and appreciated upon review of the following detailed description of the invention, taken in conjunction with the following drawings, which are incorporated in and constitute a part of the specification, illustrate an embodiment of the invention and in which.

For convenience in description, identical components have been given the same reference numbers in the various drawings.

DETAILED DESCRIPTION OF THE INVENTION

In the following description, for purposes of clarity and conciseness of the description, not all of the numerous components shown in the schematics, charts and/or drawings are described.

The description of well-known components is not included within this description so as not to obscure the disclosure or take away or otherwise reduce the novelty of the present invention and the main benefits provided thereby.

An exemplary embodiment of the present invention is described below with reference to FIGS. 1 to 5.

Figure 1:
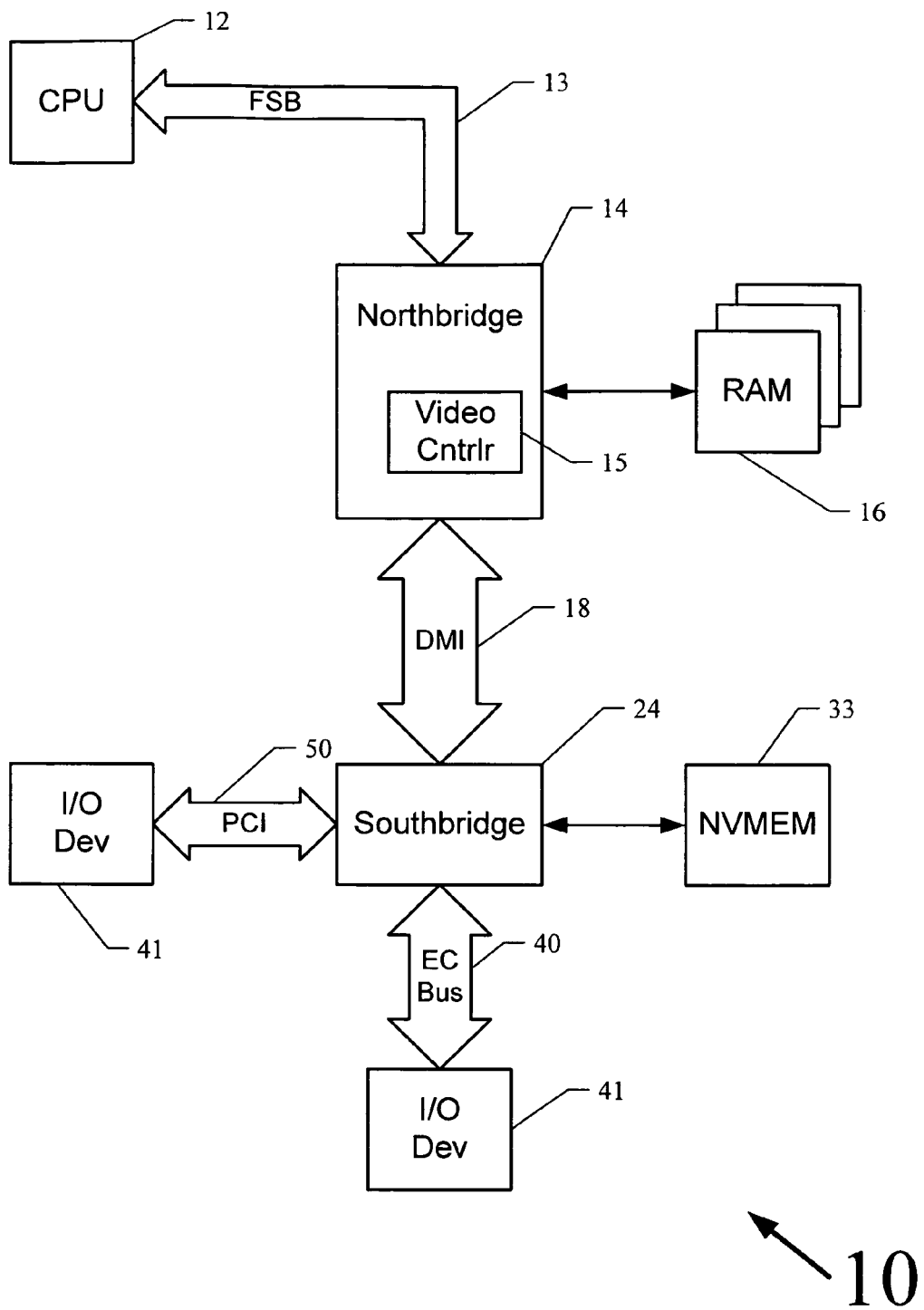
FIG. 1 is a schematic block diagram of an electronic device configured to implement the context based virtualization functionality according to an exemplary embodiment of the present invention.

FIG. 1 is a schematic block diagram of an electronic device configured to implement the context based virtualization functions according to an embodiment of the invention of the present invention.

As shown, the electronic device 10 is implemented as a personal computer, for example, a desktop computer, a laptop computer, a tablet PC or other suitable computing device. Although the description outlines the operation of a personal computer, it will be appreciated by those of ordinary skill in the art, that the electronic device 10 may be implemented as other suitable devices for operating or interoperating with the invention.

As shown, the electronic device 10 is implemented as a personal computer, for example, a desktop computer, a laptop computer, a tablet PC or other suitable computing device. Although the description outlines the operation of a personal computer, it will be appreciated by those of ordinary skill in the art, that the electronic device 10 may be implemented as other suitable devices for operating or interoperating with the invention.

The electronic device 10 may include at least one processor or CPU (Central Processing Unit) 12, configured to control the overall operation of the electronic device 10. Similar controllers or MPUs (Microprocessor Units) are commonplace and may also be used in accordance with the present invention.

The processor 12 may typically be coupled to a bus controller 14 such as a Northbridge chip by way of a bus 13 such as a FSB (Front-Side Bus). The Northbridge chip 14 may typically provide an interface for read-write system memory 16 such as semiconductor RAM (random access memory). The Northbridge chip 14 may also provide a Video Controller circuit 15 for using part of RAM 16 for video memory (e.g. for pixels, palettes and more) as well as for generating output for a display circuit (not shown).

The bus controller 14 may also be coupled to a system data highway 18, for example a DMI (Direct Media Interface) in typical Intel® style embodiments. Coupled to the DMI 18 may be a so-called Southbridge chip 24 such as an Intel® ICH8 (Input/Output Controller Hub type 8) chip.

In a typical embodiment, the Southbridge chip 24 may be connected to a PCI (peripheral component interconnect) bus 50 and an EC (Embedded Controller) bus 40, each of which may in turn be connected to various input/output devices 41, for example, a display, a keyboard, a mouse, a touchpad, a printer, a biometric sensor or other suitable devices and combinations thereof. In a typical embodiment, the Southbridge chip 24 may also be connected to at least one form of NVMEM (non-volatile read-write memory) 33 such as a Flash Memory and/or a Disk Drive memory.

Storage recorders and communications devices including data transmitters and data receivers may also be used (not shown in FIG. 1, but see FIGS. 5 and 6) such as may be used for data distribution and software distribution in connection with distribution and redistribution of executable codes and other programs that may embody the parts of invention.

Figure 2:
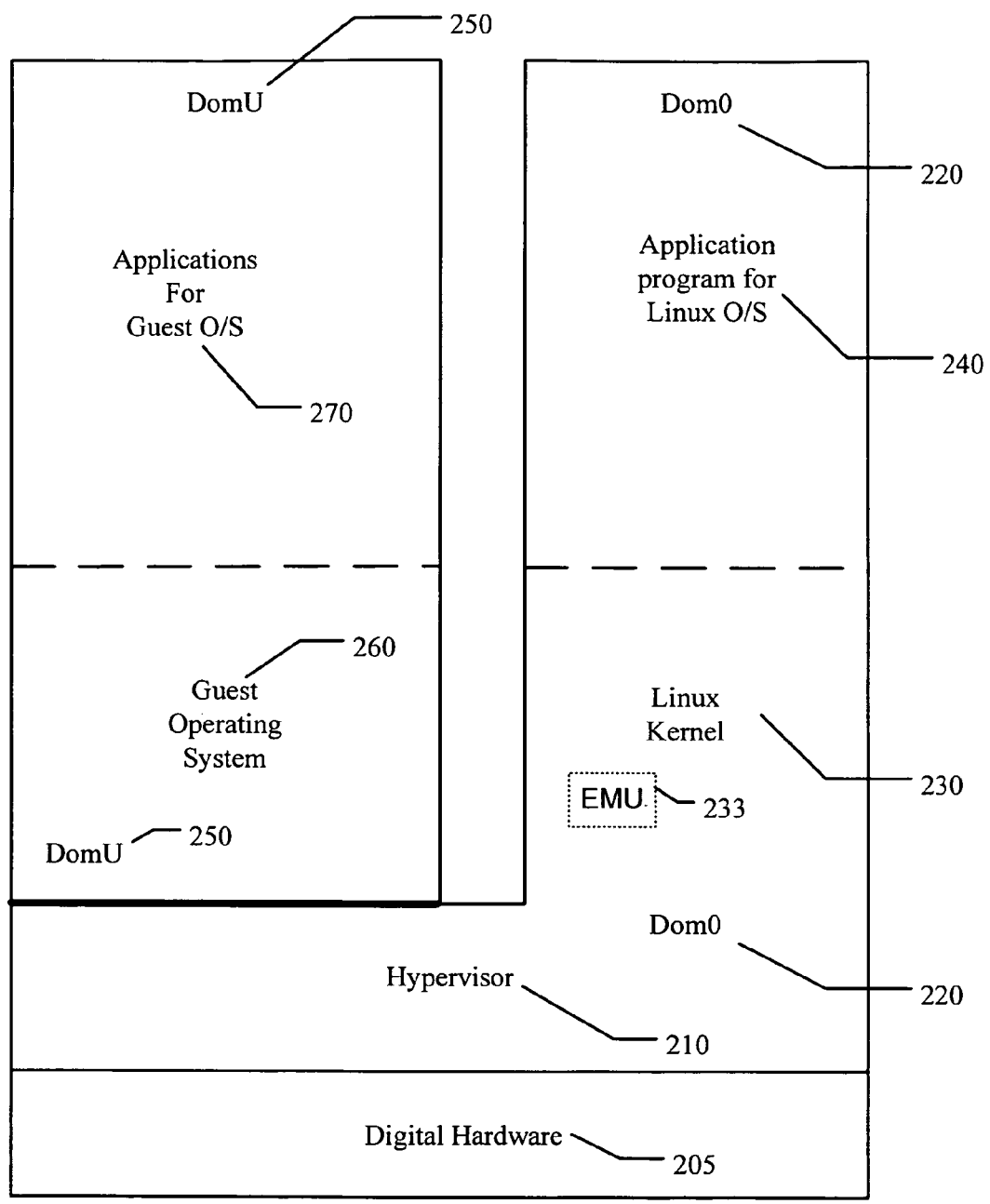
FIG. 2 is a block diagram that shows the architectural structure of components of an exemplary embodiment of the present invention.

FIG. 2 is a block diagram that shows the architectural structure 200 of the software components as implemented according to the present invention. FIG. 2 does not represent layout order or even juxtaposition in physical memory, rather it illustrates the software architectural interrelationship according to an exemplary embodiment of the invention.

FIG. 2 is a block diagram that shows the architectural structure 200 of the software components as implemented according to the present invention. FIG. 2 does not represent layout order or even juxtaposition in physical memory, rather it illustrates the software architectural interrelationship according to an exemplary embodiment of the invention.

The Hypervisor 210 is found near the bottom of the block diagram to indicate its relatively close architectural relationship with the underlying computer (e.g. digital) hardware 205. The Hypervisor 210 forms an important part of Dom0 220, which (in one embodiment of the invention) may be a modified version of a Linux® software stack.

Dom0 or Domain Zero is a term used in the hypervisor arts to refer to the "privileged domain", which is typically embodied as a VM (Virtual Machine) that has greater privilege than all other domains or VMs (known as DomU 250 for "unprivileged domain"). Within Dom0 lies the Linux® kernel 230 program, upon which the applications 240 programs for running on a Linux® kernel may be found.

Also within the Linux kernel 230 lies an EMU 233 (I/O emulator subsystem) which is a software or firmware module whose main purpose is to emulate I/O (Input-Output) operations.

Generally speaking, the application program (usually only one at a time) within Dom0 runs in a relatively privileged CPU mode, and such programs are relatively simple and hardened applications, for example email client programs and movie disc players. CPU modes and their associated levels of privilege are well known in the relevant art and will not be discussed in too great of detail within this disclosure.

Dom0 is thus, in an exemplary embodiment of the present invention, a privileged domain. That is to say that Dom0 runs in a privileged CPU mode, for example Ring 0 in an IA-32 architecture. In one embodiment, Dom0 comprises the Hypervisor 210, Linux® kernel 230, including I-O emulation features, and hardened applications 270.

Also running under the control of the Hypervisor 210 is the untrusted or unprivileged domain—DomU 250 software. Within the DomU 250 may lie the guest O/S 260, and under the control of the guest O/S 260 may be found (commonly multiple instances of) applications 270 that are compatible with the guest O/S. According to an exemplary embodiment, the guest O/S 260 is the opaque O/S referred to previously.

Figure 3:
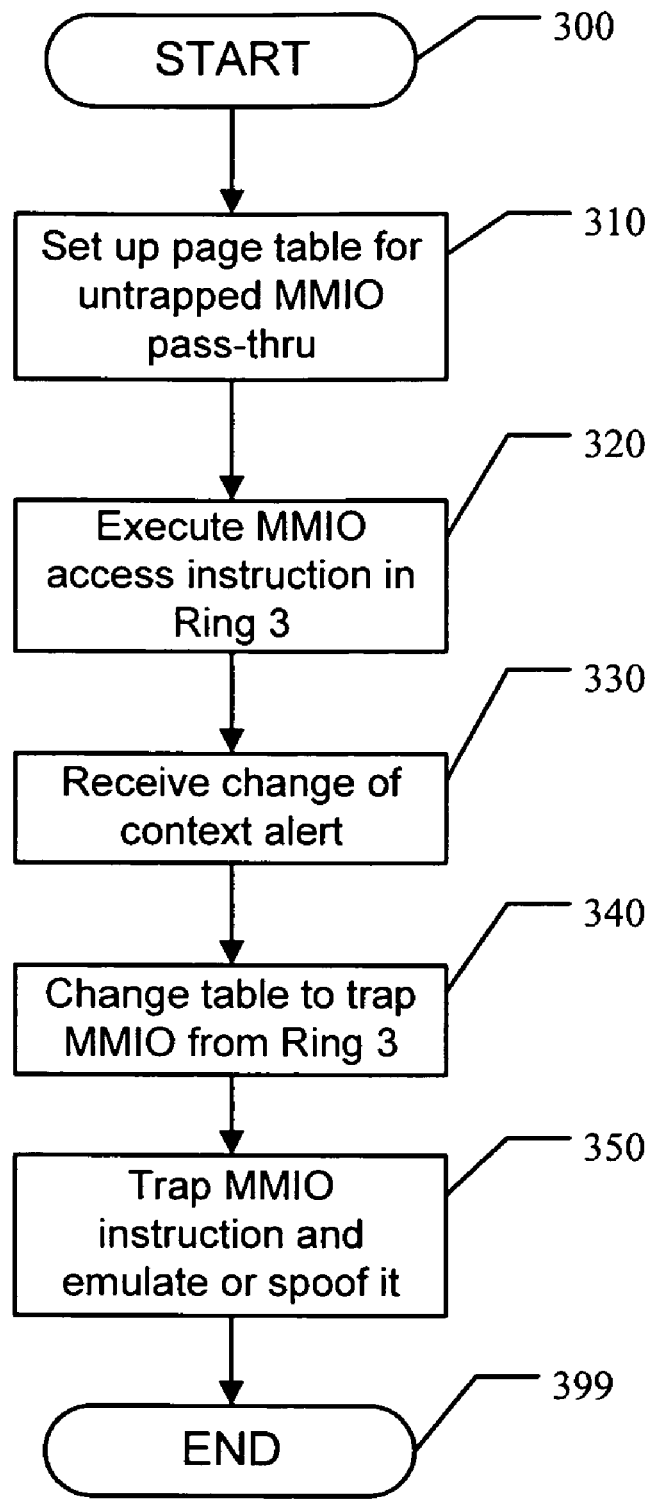
FIG. 3 is a flowchart that shows techniques used to implement an exemplary embodiment of the present invention.

FIG. 3 is a flowchart that shows certain virtualization techniques used to implement context-based virtualization according to the invention The method starts at box 300 and continues through box 399. At box 310 a page table for an MMIO (memory-mapped Input-Output) address (or more typically a range of MMIO addresses) is set to allow permission for MMIO accesses from Ring 3. The mechanisms for setting such permission vary according to architecture. For example, in some older architectures the permissions may be maintained in descriptor table entries and implemented at the segment level rather than at the page level. In newer architectures, the permissions may be maintained in page tables. But whether at page level or the substantially equivalent descriptor level, permissions are set so that an MMIO access to the MMIO address(as) does not result in a trap.

We may say that the instruction is operative to make an MMIO access that is untrapped from Ring 0. But for the granting of permission a making of an MMIO access instruction would typically have been trapped. For example, in the IA-32 architecture, attempting to make an MMIO from a Ring 3 (i.e. unprivileged) processor state will produce a GPF (General Protection Fault; which is a type of trap) if the MMIO address is not covered by a relevant Page Table entry. That is assuming paging is enabled; otherwise, segmentation/descriptor based permission handling may apply. A GPF would typically be caught (trapped) by code that executes in a Ring 0 CPU state (or privileged processor state in a more general case). In some embodiments of the invention the CPU chip may include multiple cores or processors but the principles involved are substantially the same.

The type and nature of the PT (Page Table) structures may vary greatly from one CPU architecture to another. For example, the Intel IA-32 and x86-64 architectures may provide for an entire hierarchy of tables within PT structures. Such hierarchies may contain a page table directory, multiple cascaded or nested page tables and other registers and/or structures. In an exemplary embodiment of the present invention, setting up the PT for untrapped access at the respective MMIO address amounts to enabling pass-thru access from Ring 3 program code.

At box 320, the instruction that makes an MMIO access for which the address is resolved is executed. Because the page table permission bit(s) have been altered (as described above) and the address matches, then the instruction executes untrapped even though the instruction executes in Ring 3 (or similar relatively less privileged state). As a practical matter such instruction is likely part of a device driver within an O/S that runs in DomU (an unprivileged domain) under the control of a hypervisor program.

At box 330, notification of a change of context is received. This may typically be responsive to a hot-key or key combination, or alternatively it may arise programmatically according to an implementation choice. In an embodiment of the invention this may typically arise because the user has switched their attention from the programs running under the one opaque O/S in DomU to the privileged O/S in Dom0.

The concept of Context is now discussed. In an exemplary implementation there may be a complex and closed operating system with a panoply of applications programs running on it and also an open operating system with a very few hardened applications, such as a basic and generic email client and a movie player. Context then, as to a particular peripheral device, associated device driver program and application program, and the operating system upon which the program runs may commonly be closely correlated with user focus. For example, a graphical design program might run on the closed operating system and have a context that depends on whether the user is revising the design through the program's GUI (graphical user interface) or doing something else entirely unrelated such as watching a movie under the control of the open operating system. Thus, for example, a DVD (Digital Versatile Disc) device may be pass-thru for the movie while it is displayed but emulated when the movie is not displayed, and this reflects two contexts.

However, it should be noted that Context and user focus are not always equivalent even though one well illustrates the other. For example, one might be "burning" a writeable Compact Disc without the user focus and yet want the same (high-priority, pass-thru) context irrespective of wherever the user's focus of attention presently lies.

The user may initiate a context change and within part of the context switchover the contents of the video display may change from being controlled by DomU programs to being controlled by a Dom0 program or vice-versa. Thus, the change of context may move visual appearance of the application program(s) in DomU from the foreground to the background (or vice-versa) and the Dom0 application program(s) conversely. Typically, but not essentially, the foreground application program(s) occupy the full screen visible area and the applications in the background are less visible, if visible at all. However background applications could generate notification beacons or screen icons or the like in some embodiments.

At box 340, a PT (or other structure) is changed so that accesses to the same MMIO address(es) as previously described now become trapped. That is to say such execution generates a GPF or similar execution condition. In effect the pass-thru capability of the pertinent device driver in the unprivileged domain is suspended; that is to say the Ring 3 access permission is revoked, at least in part (i.e. as to at least some of the relevant addresses). This revocation of pass-thru capability is responsive to the change of context, or more exactly responsive to receiving notice of the change. Since PT entries may be cached in some implementations further steps, for example, partly or wholly flushing cache tables may be needed in some embodiments so as to ensure cache consistency.

At box 350, the pass-thru capability having been revoked, a further MMIO access to the same address becomes trapped. In an embodiment this may occur because the DomU operating system has lost the context focus but is still accessing (making MMIO to) the associated peripheral device. Since the access is trapped it will be serviced by a handler program (usually a Ring 0 handler in a common embodiment). This servicing may involve issuing a copy of the trapped instruction from the handler in a privileged processor state, or alternatively the handler may elect to generate artificial or surrogate data or may generate the status it wishes the trapped program to receive.

In an exemplary embodiment, if the unprivileged O/S were a version of the Vista® product it might be supporting an application program that is reading data from a DVD and playing it. In the circumstances that the DomU O/S loses the context focus then the movie is no longer to appear on the screen and the handler may choose to issue a simulated "No media" status that does not reflect the true state of the DVD device. This can cause the DomU O/S supervised application program to behave as though the user had ejected the DVD medium while the movie was playing and thereafter cause the program to enter some form of recovery or process for terminating the movie playback.

At box 399, the method ends.

Figure 4:
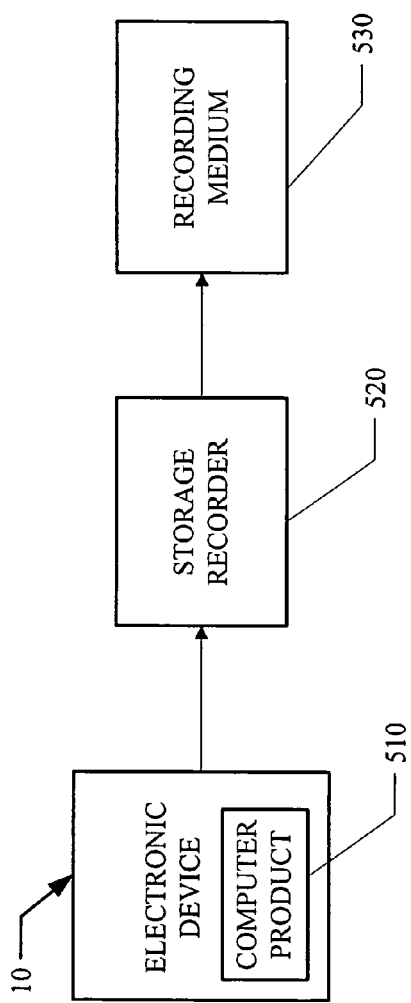
FIG. 4 shows how an exemplary embodiment of the present invention may be encoded onto computer medium or media.

FIG. 4 shows how an exemplary embodiment of the invention may be encoded onto a computer readable medium or media. As illustrated in FIG.4, computer instructions to be incorporated into in an electronic device 10 may be distributed as manufactured firmware and/or software computer products 510 using a variety of possible computer readable media 530, for example CD (Compact Disc) or PROM (Programmable Read-Only Memory), having the instructions recorded thereon such as by using a storage recorder 520. Often in products as complex as those that deploy and implement the present invention, more than one medium may be used; both in distribution and in manufacturing relevant product. Only one medium is shown in FIG. 4 for clarity but more than one medium may be used and a single computer product may be divided among a plurality of media.

Figure 5:
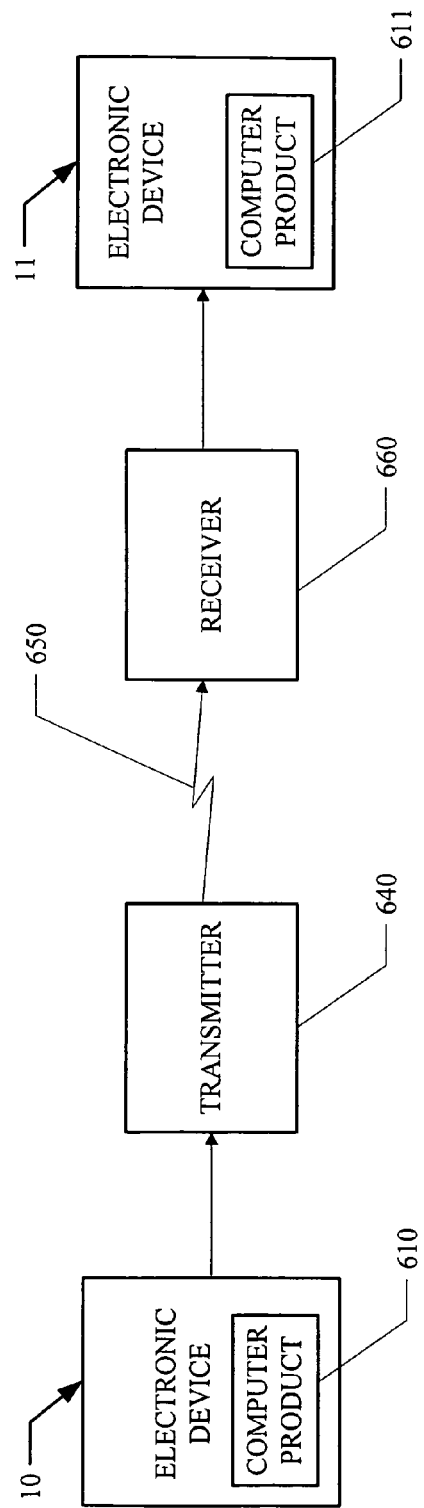
FIG. 5 shows how an exemplary embodiment of the present invention may be encoded, transmitted, received and decoded using electromagnetic waves.

FIG. 5 shows how an exemplary embodiment of the invention may be encoded, transmitted, received and decoded using electromagnetic waves. As illustrated in FIG. 5, additionally, and especially since the rise in Internet usage, computer program products 610 may be distributed by encoding the corresponding instructions into signals modulated as a wave. The resulting waveforms may then be transmitted by a transmitter 640, propagated as tangible modulated electromagnetic carrier waves 650 and received by a receiver 660. The carrier waves may be impressed on a metallic or non-metallic pre-formed medium, such as a copper conductor, or may be carried wirelessly through an atmospheric medium such as air. Upon reception, they may be demodulated and the signal decoded into a further version or copy of the computer product 611 in a memory or other storage device that is part of a second electronic device 11 and typically similar in nature to electronic device 10. Other topologies and/or devices, for example, Internet Protocol routers and cables thereto may also be used to construct alternative embodiments of the present invention as is well-known.

The embodiments described above are exemplary rather than limiting and the scope and bounds of the invention should be determined from the claims. Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method of executing a hypervisor program comprising:
    setting up a page table entry to set a permission associated with a MMIO (memory mapped input-output) address, for an instruction to execute untrapped from within an unprivileged domain, the instruction being operative to make a MMIO access at the MMIO address;
    executing the instruction an initial time;
    revoking the permission in response to a first change of context; and
    trapping a subsequent execution of the instruction.

2. The method of claim 1 wherein:
    the step of executing the instruction an initial time is performed in a Ring 3 processor state.

3. The method of claim 1 further including the step of:
    reinstating the permission responsive to a second change of context.

4. The method of claim 1 further including the step of:
    issuing a copy of the instruction in a privileged CPU state responsive to the trapping the subsequent execution of the instruction.

5. The method of claim 4 further wherein:
    the subsequent execution of the instruction is performed in a Ring 3 processor state; and
    the privileged CPU state is a Ring 0 processor state.

6. The method of claim 1 further including the step of:
    emulating a peripheral device responsive to the trapping the subsequent execution of the instruction.

7. The method of claim 6 further including the steps of:
    providing surrogate peripheral device data to the unprivileged domain;
    and wherein the subsequent execution of the instruction is for a MMIO read access.

8. The method of claim 6 further including the step of:
    simulating a media-absent status.

9. A computer program product comprising:
    at least one computer-readable medium having instructions encoded therein, the instructions when executed by at least one processor cause said at least one processor to operate for context based virtualization by steps comprising the acts of:
    setting up a page table entry to set a permission associated with a MMIO (memory mapped input-output) address, for an instruction to execute untrapped from within an unprivileged domain, the instruction being operative to make a MMIO access at the MMIO address;
    executing the instruction an initial time;
    revoking the permission in response to a first change of context; and
    trapping a subsequent execution of the instruction.

10. The computer program product of claim 9 wherein the instructions further cause the at least one processor to:
    reinstate the permission responsive to a second change of context.

11. The computer program product of claim 9 wherein the instructions further cause the at least one processor to:
    issue a copy of the instruction in a privileged CPU state responsive to the trapping the subsequent execution of the instruction.

12. A method comprising:
    an act of modulating a signal onto an electromagnetic carrier wave impressed into a tangible medium, or of demodulating the signal from the electromagnetic carrier wave, the signal having instructions encoded therein, the instructions when executed by at least one processor causing said at least one processor to
    operate for context based virtualization by steps comprising the acts of:
    setting up a page table entry to set a permission associated with a MMIO (memory mapped input-output) address, for an instruction to execute untrapped from within an unprivileged domain, the instruction being operative to make a MMIO access at the MMIO address;
    executing the instruction an initial time;
    revoking the permission in response to a first change of context; and
    trapping a subsequent execution of the instruction.

13. The method of claim 12 wherein the acts further include:
    reinstating the permission responsive to a second change of context.

14. The method of claim 12 wherein the acts further include:
    issuing a copy of the instruction in a privileged CPU state responsive to the trapping the subsequent execution of the instruction.

15. An electronic device comprising:
    at least one controller; and
    at least one non-volatile memory having instructions encoded therein, the instructions when executed by the controller cause said controller to
    operate for context based virtualization by steps comprising the acts of:
    setting up a page table entry to set a permission associated with a MMIO (memory mapped input-output) address, for an instruction to execute untrapped from within an unprivileged domain, the instruction being operative to make a MMIO access at the MMIO address;
    executing the instruction an initial time;
    revoking the permission in response to a first change of context; and
    trapping a subsequent execution of the instruction.

16. The electronic device of claim 15 wherein the instructions when executed by the controller further cause said controller to reinstate the permission responsive to a second change of context.

17. The electronic device of claim 15 wherein the acts further include:
    issuing a copy of the instruction in a privileged CPU state responsive to the trapping the subsequent execution of the instruction.

* * * * *